United States Patent Office 3,526,492
Patented Sept. 1, 1970

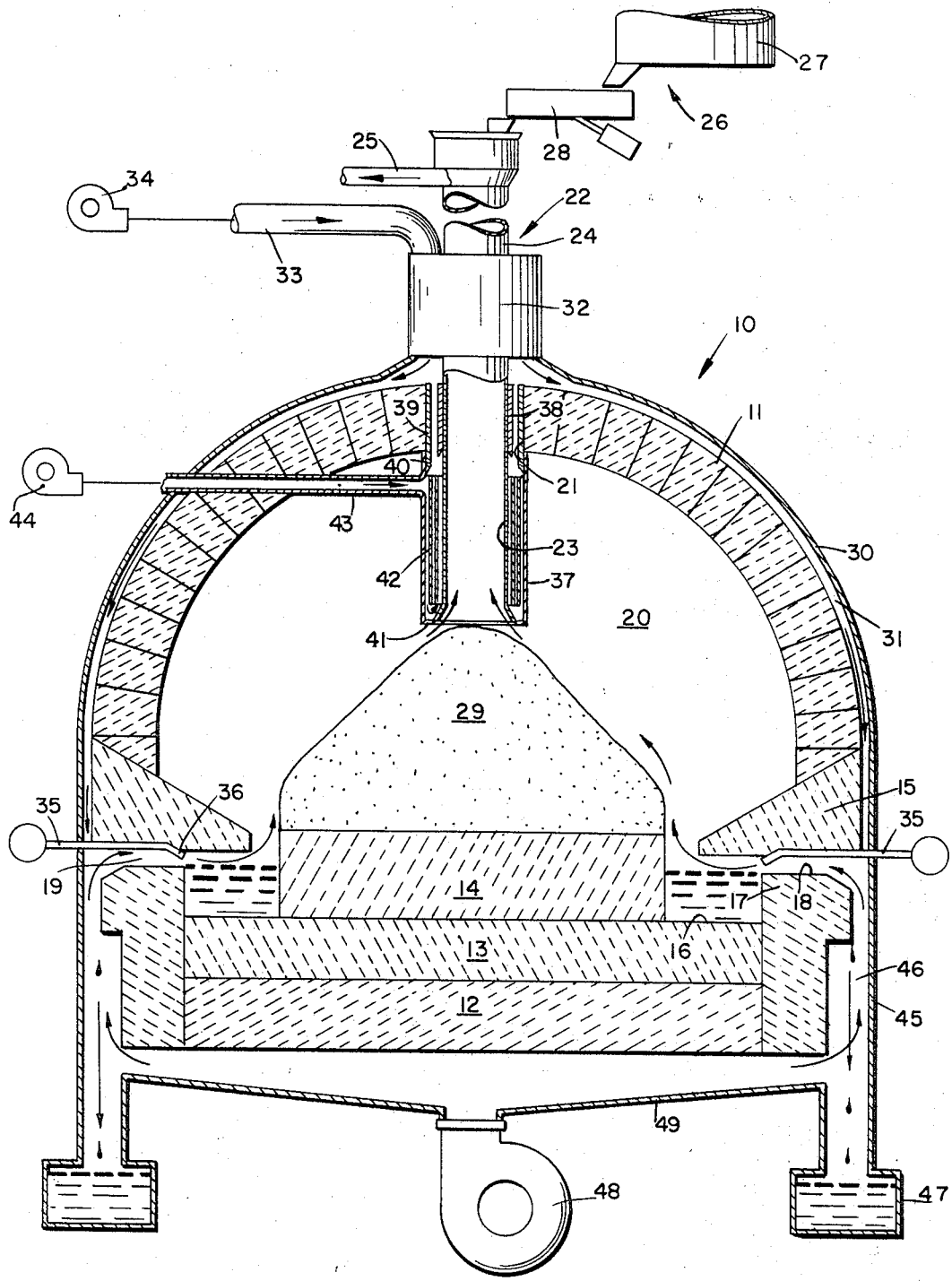

3,526,492
GLASS PREMELTER
Fred R. Motsch, 715 Spencer Ave.,
Marion, Ind. 46952
Filed Sept. 16, 1968, Ser. No. 762,180
Int. Cl. C03b 5/16
U.S. Cl. 65—335                      12 Claims

ABSTRACT OF THE DISCLOSURE

A glass premelter comprising a furnace constructed primarily of refractory material defining a combustion chamber to which glass ingredients are supplied, preferably in the form of moistened particles of mixed ingredients, through a stack centrally penetrating the chamber roof, the stack having a portion disposed outside the combustion chamber and being arranged to conduct hot products of combustion upwardly, in counterflow contact with such particles, for exhaust from said chamber, the furnace being enshrouded by a jacket defining, with the external surface of said furnace, an air space through which combustion air is supplied, by blower means delivering to the upper portion of said air space, to the lower portion of said chamber where fuel is likewise supplied to said chamber, said stack further having a portion disposed within said chamber and surrounded by a baffled shell through which further combustion air is supplied, through a path in heat-exchanging relation first with the interior of said chamber and then with said last-mentioned portion of said stack, to the upper portion of said air space, the ingredient particles being delivered from said stack to pile up on a central island in the floor of said combustion chamber whence melted glass will flow to an island-circumscribing well whose outer boundary is defined by a dam, the rim of said dam being disposed at a level below that of said island so that molten glass will overflow said dam rim to fall, through a passageway, to collector means arranged at a still lower level. In a preferred form, still further combustion air is supplied, through said passageway in counterflow contact with such overflowing molten glass, over the dam rim to the combustion chamber at the level of fuel injection thereto. Thereby, the regenerator system conventionally required in glass melters is obviated.

---

In conventional furnaces for melting the ingredients in the manufacture of glass, it is almost universally customary to employ a regenerator system through which gas flow is reversed at intervals usually of approximately twenty minutes. Such a system is expensive to install and to operate, adds significantly to the amount of heat required to manufacture glass and has a relatively short life. A primary object of the present invention, then, is to provide a glass premelter of such character that the conventional regenerator system may be wholly eliminated.

To that end, the present invention may be embodied in a furnace of such character as to utilize the counterflow principle to a maximum extent, thereby conserving heat, protecting the physical structure to a maximum extent against heat damage and providing a continuous system in which the ingredients of a glass melt are continuously supplied to a combustion chamber, such ingredients are therein continuously melted and the molten glass is continuously withdrawn, without significant contamination by unmelted batch ingredients.

A further object of the invention is to provide apparatus in which heat which is wasted in conventional procedures will be utilized by transferring it, before discharge of the glass and the products of combustion, to preheat the ingredients to be melted and the combustion air to be used in the furnace.

Still further objects of the invention will appear as the description proceeds.

The above-mentioned and other features and objects of this invention and the manner of attaining them will become more apparent and the invention will be best understood by reference to the following description of an embodiment of the invention taken in conjunction with the accompanying drawing wherein:

The single figure is a somewhat diagrammatic central, vertical section through a glass premelter constructed in accordance with the present invention, parts being shown symbolically and/or in elevation.

Referring more particularly to the drawing, it will be seen that I have illustrated a furnace or premelter indicated generally by the reference numeral 10 and including a roof 11 which will be constructed from suitable refractory material which may be built up with conventional refractory brick or block or which may preferably be produced as an integral, or integrated, fused cast arch. As shown, the roof 11 is substantially hemispherically domed; but it will be understood that the roof shape is relatively unimportant to the present invention, and it may be coned, pyramidal, semicylindrical or polygonal in vertical section. Likewise, while I presently believe that the furnace should preferably be circular in horizontal section, that shape is also relatively unimportant to my invention and it may be triangular, rectangular or otherwise polygonal.

In any event, the roof 11 is, as shown, supported from a floor which, in the illustrated embodiment of the invention, consists of three layers 12, 13 and 14 of suitable paving. Preferably, the layers 12 and 13 will be zircon brick or fused cast blocks of refractory material; but the layer 14 will desirably be constituted from fused cast blocks. A ring 15 of suitable refractory material provides a radially inwardly and downwardly sloping surface which overhangs an annular well 16 surrounding the paving layer 14, the inner boundary of said well being constituted by the upstanding wall of what may be considered an island 14. The outer boundary of the well 16 is defined by a dam ring 17 whose upper rim 18 is disposed below the level of the island 14, thereby defining a peripheral series of openings 19 leading outwardly from the combustion chamber 20 defined within the furnace for purposes later to be described.

The roof 11 is preferably centrally formed with a port 21 which is penetrated by a stack, indicated generally by the reference numeral 22. A lower portion 23 of the stack is thus positioned within the combustion chamber 20, while the upper portion 24 thereof, which will be of a height to be determined in accordance with the explanation to follow, will be disposed outside the combustion chamber. Conduit means 25 is indicated near the upper extremity of the stack 22 to carry away products of combustion to exhaust. It will be obvious, of course, that the lower end of the stack 22 is open for the reception of the hot products of combustion to flow upwardly through the stack 22 and thence, through the conduit means 25, to exhaust.

The ingredients of the glass to be produced will be fed to the furnace through the upper end of the stack 22. Such ingredients will be conventional and will depend upon the kind of glass to be produced. For instance, for flint glass, such ingredients will be sand, soda ash, feldspar and lime or limestone in conventional proportions; but my invention is not concerned with the particular composition of the formula to be melted.

However, for optimum performance, I prefer to feed the ingredients to the furnace in the form of moistened, relatively small particles of the selected formula. Thus, in the drawings, I have suggested special feeding apparatus 26 comprising a mixer 27 in which the several ingredients can be mixed and moistened, and a disintegrater means 28 in which the moistened mix will be broken down into particles on the dimensional order of one half inch or smaller. One form of disintegrater which might be used at this point may include means for forcing the moistened mixture through an orifice plate to break the material up into discrete particles or drops. Any suitable means can be provided for delivering such particles, at a controlled rate, to the upper end of the stack 22 so that such particles will fall through the stack, in counterflow relation to the ascending gases in the stack, to be deposited upon the island 14 where such particles will form a pile as suggested at 29.

It will be apparent that, as the particles of mixture fall through the upwardly flowing gases in the stack, they will be preheated, and the gases will be cooled, to a degree dependent upon numerous factors including the size and specific gravity of the particles of mixture, the height of the stack and the rate of upward flow of hot combustion gases emerging from the chamber 20, since the upward velocity of such gases will have some tendency to counteract the effect of gravity and to suspend or "float" the particles of mixture within the stack. Thus, some of the heat of the gases emerging from the combustion chamber 20, which would otherwise be wasted, is utilized to preheat the glass formula as it enters the combustion chamber.

According to the present invention, a jacket 30 completely enshrouds at least the roof 11, being slightly spaced outwardly from the external surface of said roof to define an air space 31. The jacket 30 may be formed from steel, stainless steel or air-tight, insulating, refractory brick, though I presently believe sheet stainless steel to be the optimum material for such jacket. Desirably, such sheet stainless steel may be externally covered with some sort of heat-insulating material such as, for instance, asbestos tape. At any rate, the jacket 30 completely enshrouds the roof of the furnace, at least the lower extremity of the portion 24 of the stack 22, and preferably at least a part of the furnace floor. Desirably, a heat exchanger 32 surrounds the stack portion 24 immediately above the enshrouded portion thereof and opens into the air space 31. Conduit means 33, leading from an air supply source which may be, for instance, the blower 34 indicated in the drawing or any other means for delivering air at a controlled rate, delivers air to the heat exchanger 32 and thus to the space 31. As is clearly shown, air so supplied through the conduit means 33 will pick up heat from the stack portion 24 in the heat exchanger 32 and, as it flows through the air space 31, will pick up more heat radiating through the combustion chamber roof 11. Thus, when that air reaches the openings 19 to flow therethrough across the surface of molten glass in the well 16 and past the ring 15 into the combustion chamber 20, it will be at a significantly superatmospheric temperature as a result of its absorption of heat which, in the conventional furnace, would be wasted.

Positioned in the openings 19, I provide a plurality of fuel injectors 35 so constructed and arranged at peripherally spaced points that their tips 36 will direct jets of fuel downwardly and inwardly across the level of molten glass in the well 16. Obviously, as such fuel is discharged from the injectors 35 into the stream of hot air flowing inwardly through the openings 19, the fuel will mix with the air and be ignited so that streams of flame will flow inwardly across the surface of the molten pool in the well 16 at a velocity dependent upon the rate of supply of combustion-supporting air to said openings.

It will be apparent that the pile 29 of glass formula particles, being disposed within the combustion chamber, will be subjected to the very high temperature maintained therein, and that the external surface of that pile substantially coincides with the line of direct flow from the inner ends of the openings 19 to the open lower end of the stack section 23. Thus the surface of the pile will be continually swept by flame and the material composing the pile will melt primarily from its external surface inwardly. Molten glass will thus trickle constantly downwardly over the external surface of the pile 29 and into the well 16. This trickle will have a tendency to erode the surface of the pile and to carry unmelted particles, by entrainment, into the well where such particles will float on the surface of the molten glass pool. However, the above mentioned flow of air and fuel inwardly across the surface of the pool will apply force to such floating particles tending to restrain them from moving outwardly over the lip or rim 18 of the dam 17 until, by heat absorbed from such flame and from the pool of molten glass in which they are floating, they are completely melted.

In some installations, it will be desirable to absorb still more heat from the products of combustion and to utilize that heat in combustion air being supplied to the combustion chamber. To that end, I have shown a shell 37 enshrouding that portion 23 of the stack 22 which is disposed within the combustion chamber. As shown in the drawing, a collar 38 helps to support the stack 22 from a tubular bracket 39 fixedly supported in the port 21, said bracket having a depending portion 40 extending into the combustion chamber 20 and telescopically receiving the upper end of the shell 37. The lower end 41 of the shell is closed in surrounding relation to the open lower end of the stack, and baffle means 42 is disposed within the shell 37, said baffle means defining a flow path for air delivered through conduit means 43 from a supply source 44, which flow path extends downwardly from the point of juncture of the conduit means 43 with the shell, to the bottom of the shell and thence upwardly, through the interior of the baffle means 42, into and through the tubular bracket means 39 which, in turn, opens into the air space 31 at the upper end of the port 22.

Means must be provided, of course, for conducting molten glass which overflows the rim 18 of the dam 17, to a point of collection. In the illustrated embodiment of the invention, the jacket 30 is continued downwardly in the form of a skirt 45 and said skirt cooperates with the furnace floor to define a passageway 46 leading from the openings 19 to a collector means indicated somewhat diagrammatically at 47. In order further to conserve heat, as well as to cool the molten glass to optimum use temperature, or even to such lower temperature as to produce cullet in the collector 47, I may provide still another source of air 48 delivering to a pan or conduit means 49 which, in turn, communicates with the passageway 45 at a point between the openings 19 and the collector means 47.

Desirably, but not necessarily, the rate of supply of air from whatever source or sources to the combustion chamber, will be controlled to meet the theoretical requirements of the glass making process, with a small overage as a safety factor. To that end, the sources 34, 44 and 48 may be variable-volume pumps or blowers, or control devices may be installed in the conduit means 33, 43 and 49; and, depending upon the requirements and the performances of the various portions of the disclosed system, under varying conditions of formula and/or environment, the several control devices may be balanced to achieve optimum heat transfer conditions upon the several streams of air as described above.

Ideally, the height of the stack portion 24 will be such, as determined empirically or by calculation, that the heat exchanger 32 and the moistened particles of formula falling through the rising gases in the stack will absorb substantially all of the sensible heat from said gases and the gases will be discharged through the conduit means 25 substantially at atmospheric temperature, limited by the economics of the system.

It will be obvious that, if cullet is the desired end product of the apparatus herein disclosed, the collector means 47 may be a revolving pan, with means being provided at one or more points in the path of the pan to remove the cullet therefrom continuously.

While there have been discussed above the principles of this invention, in conjunction with specific apparatus, it is to be clearly understood that this description is made by way of example and not as a limitation to the scope of the invention.

What is claimed is:

1. A glass premelter comprising means defining a chamber having a floor and a roof, said floor being formed to provide an annular well having an outlet, a plurality of fuel injectors peripherally spaced about said chamber-defining means to deliver fuel to said well at points above the bottom of the well, a stack substantially centrally penetrating said chamber roof and opening into said chamber, conduit means communicating with said stack outside said chamber for exhausting products of combustion from said chamber, means outside said chamber for delivering glass ingredients to said chamber through said stack in counterflow relative to such products of combustion in said stack, a jacket enshrouding said chamber-defining means in spaced proximity thereto to define therewith an air space in open communication with said chamber in the immediate vicinity of said fuel injectors, and means for supplying combustion-supporting air to said air space.

2. The device of claim 1 in which said jacket enshrouds also a portion of said stack and said combustion-supporting air is delivered to said air space adjacent the upper end of the stack-enshrouding portion of said jacket.

3. The device of claim 2 including a heat-exchanger interposed between said jacket and the point of delivery of said means for supplying air to said air space.

4. The device of claim 1 in which the radially-inward boundary of said well defines an island substantially centered beneath the lower end of said stack and the radially-outward boundary of said well constitutes a dam whose rim is disposed below the level of said island to provide the outlet from said well.

5. The device of claim 4 in which said fuel injectors enter said well over the rim of said dam.

6. The device of claim 4 in which said air space communicates with said chamber over the rim of said dam.

7. The device of claim 6 in which said fuel injectors enter said well over the rim of said dam.

8. The device of claim 1 including a shell circumscribing said stack within said chamber in spaced relation to said stack, said shell being closed at its lower end and opening at its upper end into said air space, conduit means communicating laterally with said shell near the upper end of said shell, means for delivering air through said conduit means to said shell, and baffle means within said shell for directing air so delivered to flow to the bottom of said shell and thence upwardly substantially throughout the length of said shell to said air space.

9. The device of claim 1 in which said means for delivering glass ingredients include means for mixing and moistening particles of such ingredients.

10. The device of claim 9 wherein said delivering means further includes means for screening said particles to an approximately uniform size.

11. The device of claim 4 including collector means disposed at a level below said dam, and means providing a passageway between the rim of said dam and said collector means.

12. The device of claim 11 including blower means and conduit means communicating with said passageway between said collector means and said dam and connected to receive air from said blower means, whereby such air is conducted, by counterflow relative to molten material flowing from said well to said collector means, to said combustion chamber.

References Cited

UNITED STATES PATENTS

| 1,610,377 | 12/1926 | Hitner | 65—335 X |
| 1,889,510 | 11/1932 | Amsler | 65—335 X |
| 2,455,907 | 12/1948 | Slayter | 65—16 |
| 2,718,096 | 9/1955 | Henry et al. | 65—335 |
| 3,172,648 | 3/1965 | Brichard | 65—335 X |
| 3,320,045 | 5/1967 | Weiss et al. | 65—335 |

A. D. KELLOGG, Primary Examiner

U.S. Cl. X.R.

65—337, 341, 347; 263—11